(12) United States Patent
Webb et al.

(10) Patent No.: US 11,808,194 B2
(45) Date of Patent: Nov. 7, 2023

(54) MODULAR EXHAUST AFTERTREATMENT SUBSYSTEM

(71) Applicant: PACCAR Inc, Bellevue, WA (US)

(72) Inventors: Cynthia Chaffin Webb, Sedro-Woolley, WA (US); Charles Wayne Reinhardt Swart, Bellingham, WA (US); Maarten Meijer, Anacortes, WA (US); Phillip William Stephenson, Bellingham, WA (US); Trevor Joseph Ott, Anacortes, WA (US)

(73) Assignee: PACCAR Inc., Bellevue, WA (US)

( * ) Notice: Subject to any disclaimer, the term of this patent is extended or adjusted under 35 U.S.C. 154(b) by 0 days.

(21) Appl. No.: 17/720,261

(22) Filed: Apr. 13, 2022

(65) Prior Publication Data

US 2022/0341355 A1 Oct. 27, 2022

Related U.S. Application Data

(60) Provisional application No. 63/177,936, filed on Apr. 21, 2021.

(51) Int. Cl.
*F01N 3/20* (2006.01)
*F01N 3/10* (2006.01)
(Continued)

(52) U.S. Cl.
CPC ............ *F01N 3/208* (2013.01); *F01N 3/106* (2013.01); *F01N 3/2013* (2013.01); *F01N 3/2033* (2013.01); *F01N 3/0871* (2013.01); *F01N 3/206* (2013.01); *F01N 3/2066* (2013.01); *F01N 9/005* (2013.01); *F01N 11/005* (2013.01); *F01N 2610/02* (2013.01); *F01N 2610/10* (2013.01); *F01N 2610/1453* (2013.01); *F01N 2900/04* (2013.01); *F01N 2900/1402* (2013.01); *F01N 2900/1404* (2013.01);
(Continued)

(58) Field of Classification Search
CPC combination set(s) only.
See application file for complete search history.

(56) References Cited

U.S. PATENT DOCUMENTS

| | | | |
|---|---|---|---|
| 2014/0017794 A1* | 1/2014 | Zeng | F01N 3/2066 422/62 |
| 2014/0127098 A1* | 5/2014 | Lack | F01N 3/208 422/111 |

(Continued)

*Primary Examiner* — Binh Q Tran
(74) *Attorney, Agent, or Firm* — Quinn IP Law

(57) ABSTRACT

A modular exhaust subsystem for purifying an exhaust gas feedstream of a compression-ignition internal combustion engine upstream of a base exhaust aftertreatment system includes a selective catalytic reduction (SCR) catalyst, and a first exhaust gas sensor and a first temperature sensor that are arranged to monitor the SCR catalyst. A reductant delivery system is arranged to inject a reductant upstream of the SCR catalyst. A controller is in communication with an engine-out exhaust gas sensor, a second exhaust gas sensor and a second temperature sensor that are arranged to monitor the base exhaust aftertreatment system. The controller controls the reductant delivery system to inject the reductant into the exhaust gas feedstream upstream of the SCR catalyst based upon inputs from the first and second exhaust gas sensors, the engine-out exhaust gas sensor, and the first and second temperature sensors.

17 Claims, 4 Drawing Sheets

(51) Int. Cl.
    *F01N 3/08*     (2006.01)
    *F01N 11/00*    (2006.01)
    *F01N 9/00*     (2006.01)

(52) U.S. Cl.
    CPC .. *F01N 2900/1602* (2013.01); *F01N 2900/18* (2013.01); *F01N 2900/1811* (2013.01)

(56) References Cited

U.S. PATENT DOCUMENTS

2017/0306818 A1* 10/2017 Ito ........................... F01N 3/208
2018/0258821 A1*  9/2018 Masubuchi ........... F01N 13/008
2019/0301330 A1* 10/2019 Ogushi ................... F01N 3/208
2020/0095916 A1*  3/2020 Haas ..................... F01N 3/2006
2020/0362739 A1* 11/2020 Srinivasan ................ F01N 9/00

* cited by examiner

MODULAR EXHAUST AFTERTREATMENT SUBSYSTEM

CROSS-REFERENCE TO RELATED APPLICATIONS

This application claims the benefit of U.S. Provisional Patent Application No. 63/177,936 filed on Apr. 21, 2021, the disclosure of which is hereby incorporated by reference.

INTRODUCTION

Exhaust aftertreatment systems fluidly couple to internal combustion engines to purify exhaust gases generated as byproducts of combustion. Byproducts of combustion may include unburned hydrocarbons, carbon monoxide, nitrides of oxide (NOx), and particulate matter. In general, Exhaust aftertreatment systems may include oxidation catalysts, reduction catalysts, selective catalytic reduction catalysts and particulate filters. When employed on heavy-duty diesel engines or other lean-burning configurations, an exhaust aftertreatment system may include a diesel oxidation catalyst (DOC) to oxidize unburned fuel and carbon monoxide, a diesel particulate filter (DPF) for control of particulate matter (PM), one or more selective catalytic reduction (SCR) systems for NOx reduction, and/or an ammonia oxidation catalyst (AMOX) to eliminate or minimize ammonia slip. Operation of the internal combustion engine and the exhaust aftertreatment system may be monitored by one or more sensing devices that are disposed in the exhaust gas feedstream. Operation may also be determined employing simulation models that dynamically execute during operation.

SCR catalysts may employ reductants for reducing NOx molecules to elemental nitrogen. One reductant is urea, which may be transformed into ammonia (NH3) in an exhaust system. The reductant may be injected into the exhaust gas feedstream upstream of one or multiple SCR catalysts and may be stored on a surface or otherwise captured for use in reducing NOx molecules to elemental nitrogen and water.

Performance of known SCR catalysts is dependent upon temperature, with increased performance being related to increased exhaust gas temperatures.

There is a need to provide a hardware architecture implementation and method to improve heavy-duty diesel NOx emissions in a manner that enables flexibility with existing exhaust aftertreatment hardware with added functionality and independent operation.

SUMMARY

A modular exhaust subsystem for purifying an exhaust gas feedstream of a compression-ignition internal combustion engine upstream of a base exhaust aftertreatment system is described and includes a selective catalytic reduction device (SCR) catalyst, and a first exhaust gas sensor and a first temperature sensor that are arranged to monitor the SCR catalyst. A reductant delivery system is arranged to inject a reductant into the exhaust gas feedstream upstream of the SCR catalyst. A controller is operatively connected to the reductant delivery system and in communication with the first exhaust gas sensor and the first temperature sensor. The controller is further in communication with an engine-out exhaust gas sensor, a second exhaust gas sensor and a second temperature sensor that are arranged to monitor the base exhaust aftertreatment system. The controller includes an instruction set that is executable to control the reductant delivery system to inject the reductant into the exhaust gas feedstream upstream of the SCR catalyst based upon inputs from the first and second exhaust gas sensors and the first and second temperature sensors.

Another aspect of the disclosure includes an engine-out exhaust gas sensor arranged to monitor the exhaust gas feedstream upstream of the SCR catalyst. The controller includes instruction set is executable to control the reductant delivery system to inject the reductant into the exhaust gas feedstream upstream of the SCR catalyst based upon inputs from the engine-out exhaust gas sensor, the first and second exhaust gas sensors, and the first and second temperature sensors.

An aspect of the disclosure includes the instruction set being executable to control the reductant delivery system to inject the reductant into the exhaust gas feedstream upstream of the SCR catalyst to achieve a target reductant/NOx ratio upstream of the base exhaust aftertreatment system.

Another aspect of the disclosure includes the instruction set being executable to control the reductant delivery system to inject the reductant into the exhaust gas feedstream upstream of the SCR catalyst to achieve a target ammonia storage level on the SCR catalyst.

Another aspect of the disclosure includes the first exhaust gas sensor being a NOx sensor.

Another aspect of the disclosure includes the first exhaust gas sensor being a wide range air/fuel ratio sensor.

Another aspect of the disclosure includes the reductant delivery system being arranged to inject urea into the exhaust gas feedstream upstream of the SCR catalyst.

Another aspect of the disclosure includes the reductant delivery system being arranged to inject gaseous ammonia into the exhaust gas feedstream upstream of the SCR catalyst.

Another aspect of the disclosure includes the modular exhaust subsystem being arranged in an underhood location.

Another aspect of the disclosure includes the modular exhaust subsystem being arranged in an underbody location.

Another aspect of the disclosure includes a controllable heating element being arranged in the exhaust gas feedstream upstream of the SCR catalyst.

Another aspect of the disclosure includes a heating device being arranged to transfer heat to the exhaust gas feedstream upstream of the SCR catalyst.

Another aspect of the disclosure includes an oxidation catalyst being arranged upstream of the SCR catalyst.

Another aspect of the disclosure includes a modular exhaust subsystem for an internal combustion engine in the form of a selective catalytic reduction (SCR) catalyst, a first exhaust gas sensor and a first temperature sensor arranged to monitor the SCR catalyst, a reductant delivery system arranged to inject a reductant into an exhaust gas feedstream upstream of the SCR catalyst, and a controller. The controller is operatively connected to the reductant delivery system and in communication with the first exhaust gas sensor and the first temperature sensor. The modular exhaust subsystem has a physical modularity and a control modularity in relation to a base exhaust aftertreatment system. The base exhaust aftertreatment system includes an exhaust aftertreatment device, an engine-out exhaust gas sensor, and a second exhaust gas sensor and a second temperature sensor that are arranged to monitor the base exhaust aftertreatment system.

The physical modularity of the modular exhaust subsystem includes the modular exhaust subsystem being configured to be fluidly coupled between the internal combustion engine and the base exhaust aftertreatment system. The control modularity of the modular exhaust subsystem includes the controller of the modular exhaust subsystem having an instruction set that is executable to control the reductant delivery system to inject the reductant into the exhaust gas feedstream upstream of the SCR catalyst based upon inputs from the first and second exhaust gas sensors, the engine-out exhaust gas sensor, and the first and second temperature sensors.

Another aspect of the disclosure includes instruction set being executable to control the reductant delivery system to inject the reductant into the exhaust gas feedstream upstream of the SCR catalyst to achieve a target reductant/NOx ratio upstream of the base exhaust aftertreatment system.

Another aspect of the disclosure includes the instruction set being executable to control the reductant delivery system to inject the reductant into the exhaust gas feedstream upstream of the SCR catalyst to achieve a target ammonia storage level on the SCR catalyst.

Another aspect of the disclosure includes the reductant delivery system being arranged to inject urea into the exhaust gas feedstream upstream of the SCR catalyst.

Another aspect of the disclosure includes the exhaust subsystem being arranged in an underhood location.

Another aspect of the disclosure includes the first exhaust gas sensor being a NOx sensor.

Another aspect of the disclosure includes the first exhaust gas sensor being arranged to monitor the exhaust gas feedstream upstream of the SCR catalyst, and the first temperature sensor being arranged to monitor the exhaust gas feedstream upstream of the SCR catalyst.

The above summary is not intended to represent every embodiment or every aspect of the present disclosure. Rather, the foregoing summary is intended to exemplify some of the novel aspects and features disclosed herein. The above features and advantages, and other features and advantages of the present disclosure, will be readily apparent from the following detailed description of representative embodiments and modes for carrying out the present disclosure when taken in connection with the accompanying drawings and the claims.

BRIEF DESCRIPTION OF THE DRAWINGS

One or more embodiments will now be described, by way of example, with reference to the accompanying drawings, in which.

Figure 1:
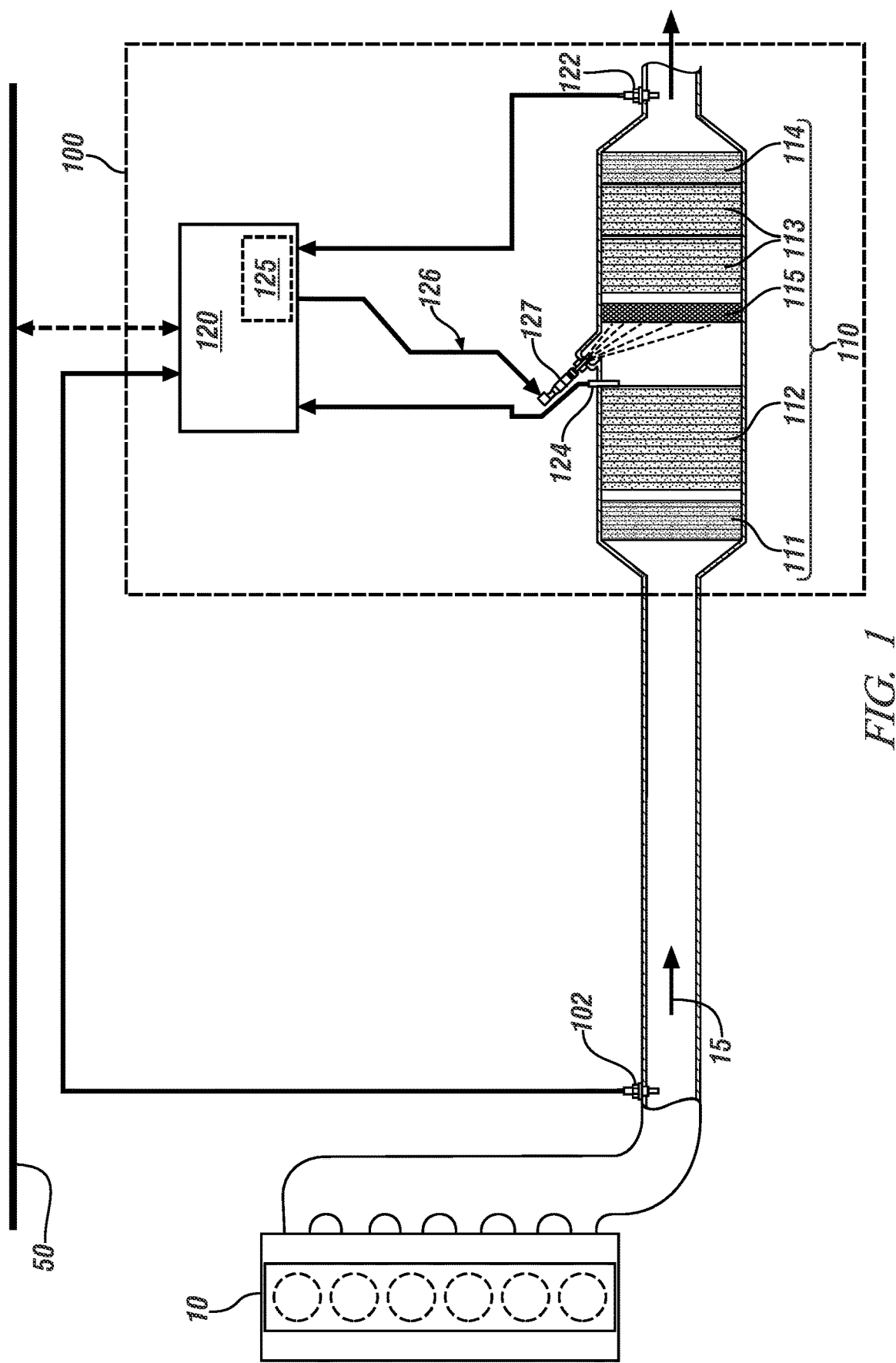
FIG. 1 schematically illustrates an internal combustion engine and a base exhaust aftertreatment system, in accordance with the disclosure.

The appended drawings are not necessarily to scale and may present a simplified representation of various preferred features of the present disclosure as disclosed herein, including, for example, specific dimensions, orientations, locations, and shapes. Details associated with such features will be determined in part by the particular intended application and use environment.

DETAILED DESCRIPTION

The components of the disclosed embodiments, as described and illustrated herein, may be arranged and designed in a variety of different configurations. Thus, the following detailed description is not intended to limit the scope of the disclosure, as claimed, but is merely representative of possible embodiments thereof. In addition, while numerous specific details are set forth in the following description in order to provide a thorough understanding of the embodiments disclosed herein, some embodiments can be practiced without some of these details. Moreover, for the purpose of clarity, certain technical material that is understood in the related art has not been described in detail to avoid unnecessarily obscuring the disclosure. Furthermore, the disclosure, as illustrated and described herein, may be practiced in the absence of an element that is not specifically disclosed herein.

The following detailed description is merely exemplary in nature and is not intended to limit the application and uses. Furthermore, there is no intention to be bound by any expressed or implied theory presented herein. Throughout the drawings, corresponding reference numerals indicate like or corresponding parts and features. As used herein, the terms "system" and "subsystem" may refer to one of or a combination of mechanical and electrical devices, actuators, sensors, controllers, application-specific integrated circuits (ASIC), combinatorial logic circuits, software, firmware, and/or other components that are arranged to provide the described functionality.

As employed herein, the term "upstream" and related terms refer to elements that are towards an origination of a flow stream relative to an indicated location, and the term "downstream" and related terms refer to elements that are away from an origination of a flow stream relative to an indicated location.

The term 'model' refers to a processor-based or processor-executable code and associated calibration that simulates a physical existence of a device or a physical process.

The use of ordinals such as first, second and third does not necessarily imply a ranked sense of order but may only distinguish between multiple instances of an act or structure.

Figure 2:
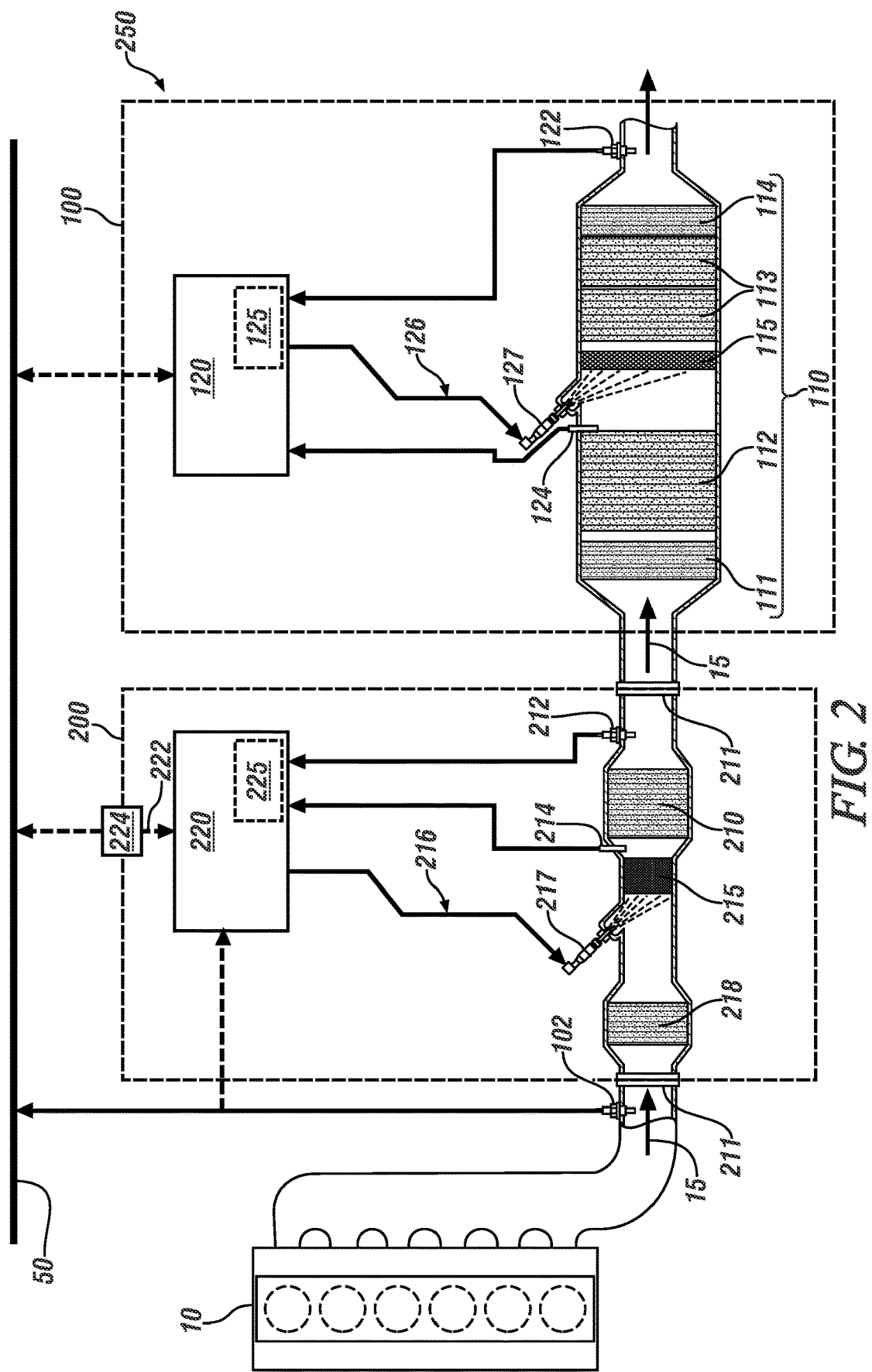
FIG. 2 schematically illustrates an internal combustion engine and an exhaust aftertreatment system that includes a modular exhaust subsystem that is arranged upstream of a base exhaust aftertreatment system, in accordance with the disclosure.

Referring to the drawings, wherein like reference numerals correspond to like or similar components throughout the several Figures, FIGS. 1 and 2, consistent with embodiments disclosed herein, schematically illustrate elements of an embodiment of an exhaust aftertreatment system 250 for purifying the exhaust gas feedstream 15 of an internal combustion engine 10, wherein the internal combustion engine 10 is controlled to operate primarily in a lean-burn air/fuel ratio environment. One example of the internal combustion engine 10 is a multi-cylinder compression-ignition internal combustion engine that is classified as a heavy-duty (HD) engine. In one embodiment, the internal combustion engine 10 is disposed on a vehicle. The vehicle may include, but not be limited to a mobile platform in the form of a heavy-duty commercial vehicle, an industrial vehicle, an agricultural vehicle, a watercraft, or a train. Alternatively, the internal combustion engine 10 may be arranged as a stationary device, such as for powering an electric power generator.

The exhaust gas feedstream 15 generated by the internal combustion engine 10 contains byproducts of combustion, including unburned hydrocarbons, carbon monoxide, nitrides of oxide (NOx), particulate matter, etc. The exhaust gas feedstream 15 is monitored by an engine-out exhaust gas sensor 102, which may be a NOx sensor, a wide-range air/fuel ratio sensor, or another sensor that monitors one or constituents of the exhaust gas feedstream 15 for purposes of monitoring and/or controlling operation of the engine 10.

Engine control includes controlling various engine operating parameters, including controlling engine control states to minimize various exhaust gas constituents through chemical reaction processes that include, by way of non-limiting examples, oxidation, reduction, filtering, and selective reduction. Other engine control states include controlling operating parameters to warm up the engine 10 and control heat transfer to various elements of the base exhaust aftertreatment system 100 to effect efficacious operation thereof. Heat transfer to the elements of the base exhaust aftertreatment system 100 may be employed for warmup and catalyst light-off, regeneration of a particulate filter, etc.

Referring again to FIG. 2, the exhaust aftertreatment system 250 includes a modular exhaust subsystem 200 that is arranged upstream of an embodiment of a base exhaust aftertreatment system 100. The base exhaust aftertreatment system 100 is also referred to herein as a second exhaust aftertreatment system 100 and is described with reference to FIG. 1. The base exhaust aftertreatment system 100 is configured to purify the exhaust gas feedstream 15 of the internal combustion engine 10 to achieve a first tailpipe emissions target in-use. The modular exhaust subsystem 200 and the base exhaust aftertreatment system 100 are configured to purify the exhaust gas feedstream 15 to achieve a second tailpipe emissions target in-use, wherein the second tailpipe emissions target is less than the first tailpipe emissions target that is achievable with the base exhaust aftertreatment system 100 alone. Selected results related to emissions performance are graphically illustrated with reference to FIGS. 3A, 3B, 3C, 4A, and 4B. The tailpipe emissions targets may in the form of regulatory emissions targets that are imposed by the US Environmental Protection Agency, the California Air Resources Board, the European Union, or other regulatory bodies. The tailpipe emissions targets may instead be in the form of in-house or user emissions targets, such as may be imposed by a private fleet owner.

The modular exhaust subsystem 200 is a stand-alone modular system that may be inserted between the engine 10 and the base exhaust aftertreatment system 100 either during engine/vehicle assembly, or as a retrofit device on an existing vehicle system. The modular exhaust subsystem 200 may be placed in an engine compartment in an underhood location, and thus may be closely coupled to the engine 10. The modular exhaust subsystem 200 may be fluidly coupled to an exhaust manifold of the engine 10, or to a fluid outlet of a turbocharger or supercharger of the engine 10. Alternatively, the modular exhaust subsystem 200 may be located underbody. As employed herein, the term "modular" and related terms that are employed to describe the modular exhaust subsystem 200 refer to exhaust aftertreatment components, actuators, sensors, control devices, etc., that are arranged to operate independently to achieve a specific result with minimal or no external dependencies or interactions from other on-vehicle systems. The specific result being achieved by one embodiment of the modular exhaust subsystem 200 is the reduction of NOx constituents in the exhaust gas feedstream 15 upstream of the base exhaust aftertreatment system 100. Furthermore, the presence (or absence) of the modular exhaust subsystem 200 is transparent to control and operation of the engine 10 and the base exhaust aftertreatment system 100. As such, the operation of the modular exhaust subsystem 200 and its effect upon the exhaust gas constituents in the exhaust gas feedstream 15 does not affect the control, monitoring, or diagnostics of the engine 10 or the base exhaust aftertreatment system 100.

The modular exhaust subsystem 200 includes, in one embodiment, a first selective catalytic reduction (SCR) catalyst 210, a first reductant delivery system 216 that is arranged to inject, via a first reductant injector 217, a reductant into the exhaust gas feedstream upstream of the first SCR catalyst 210, a first exhaust gas sensor 212 and a first temperature sensor 214 that are arranged to monitor the first SCR catalyst 210, and a subsystem controller 220. In one embodiment, a first heating device 215 is arranged to transfer heat to the exhaust gas feedstream upstream of the first SCR catalyst 210. In one embodiment, the first heating device 215 is a controllable heating element that is arranged in the exhaust gas feedstream 15 upstream of the first SCR catalyst 210. The first heating device 215 may be an electrically-powered resistive heater or heating element, a burner, or another heater, to inject heat energy into the exhaust gas flow and the injected reductant. In one embodiment, a first oxidation catalyst 218 is arranged upstream of the first SCR catalyst 210. The physical modularity of the modular exhaust subsystem 200 is depicted by mechanical interfaces in the form of optional flanges 211 for connecting the modular exhaust subsystem 200 into the exhaust gas feedstream 15 between the engine 10 and the base exhaust aftertreatment system 100, such as may be helpful in an upfit or a retrofit arrangement. It is appreciated that flanges 211 may not be necessary when the modular exhaust subsystem 200 is incorporated into a new build. The control modularity is achieved by use of the subsystem controller 220 to control the first reductant delivery system 216. The subsystem controller 220 interfaces and communicates with other controllers e.g., a second controller 120 and an engine controller, via a communication link 222 and a communication bus 50. In one embodiment, an optional communication link connector 224 links the communication link 222 to the communication bus 50.

In one embodiment, the first SCR catalyst 210 is a catalytic device that employs a reductant to reduce NOx molecules to form elemental nitrogen (N2) and other inert gases. In one embodiment, the reductant is urea, which can be converted to ammonia (NH3) that is stored on the substrate of the first SCR catalyst 210. Alternatively, the reductant may be gaseous ammonia. The first SCR catalyst 210 includes a ceramic or metallic substrate having flow channels that have been coated with suitable materials that include by way of non-limiting examples: metals, such as vanadium, copper, cerium, and/or other materials. The coated materials effect chemical reactions to reduce, in the presence of ammonia, NOx molecules in the exhaust gas feedstream to form elemental nitrogen (N2) and other inert gases, under certain conditions of the exhaust gas feedstream related to temperature, flowrate, air/fuel ratio and others.

The first reductant delivery system 216 includes the single reductant injector 217 having an injection nozzle that is positioned to inject reductant into the exhaust gas feedstream upstream of the first SCR catalyst 210. The first reductant delivery system 216 is configured to controllably supply a metered flow of reductant into the exhaust gas feedstream upstream of the first SCR catalyst 210 to facilitate NOx reduction therethrough.

The subsystem controller 220 is operatively connected to the first reductant delivery system 216 and in communication with the first exhaust gas sensor 212 and the first temperature sensor 214. The subsystem controller 220 is also in communication, via the communication bus 50, with the engine-out exhaust gas sensor 102, the tailpipe exhaust gas sensor 122 and the second temperature sensor 124 that are arranged to monitor the base exhaust aftertreatment system 100.

The subsystem controller 220 includes an instruction set that is executable to control the first reductant delivery system 216 to inject reductant into the exhaust gas feedstream 15 upstream of the first SCR catalyst 210 based upon inputs from the engine-out exhaust gas sensor 102, the first exhaust gas sensor 212, the tailpipe exhaust gas sensor 122, the first temperature sensor 214, and the second temperature sensor 124.

The modular exhaust subsystem 200 is a modular subsystem that may be employed to enable achievement of an ultra-low NOx emissions target, either in a production vehicle build, a retrofit, or an upfit to an existing vehicle or stationary system.

The modular exhaust subsystem 200 may be developed independently from the base exhaust aftertreatment system 100, with the subsystem controller 220 being separate and independent from the second controller 120 that monitors and controls the base exhaust aftertreatment system 100. As such the subsystem controller 220 is not integrated into the second controller 120 but is able to capture signal parameters from the second controller 120 to monitor and leverage the base exhaust aftertreatment system 100 to achieve a lower emissions target. The arrangement and configuration of the elements of the base exhaust aftertreatment system 100 do not require modifications to apply the modular exhaust subsystem 200, and the base exhaust aftertreatment system 100 is not aware that the modular exhaust subsystem 200 has been added.

Several advantages exist with maintaining the base exhaust aftertreatment system 100 in an unaltered configuration, including enabling a modular hardware configuration wherein all vehicles in an assembly plant use the same base exhaust aftertreatment system 100 including hardware, controller, and software, with the modular exhaust subsystem 200 being a system add-on for specific vehicles, thus facilitating a flexible vehicle manufacturing environment. Furthermore, the second controller 120 can be maintained as an independent system for purposes of control and diagnostics. The second controller 120 retains controls for the second, underbody reductant delivery system 126 and maintenance/regeneration of the particulate filter 112. The second controller 120 retains existing diagnostics for the base exhaust aftertreatment system 100. Furthermore, the benefit of adding the modular exhaust subsystem 200 in the modular configuration is that the overall system efficiency is improved with a reduction in the tailpipe NOx emissions, thus allowing the engine to spend more time in more efficient modes, thereby improving fuel efficiency. In this manner, the incorporation of an embodiment of the modular exhaust subsystem 200 into a system that has been designed to have an embodiment of the base exhaust aftertreatment system 100 provides a mechanism to achieve reduced NOx emissions for an engine system in a manner that minimizes design, development, calibration, testing, and validation efforts, when compared to development of a complete emissions and engine control system to achieve reduced NOx emissions.

Referring again to FIG. 1, the base exhaust aftertreatment system 100 is configured to purify the exhaust gas feedstream 15 to achieve a first tailpipe emissions target in-use. The base exhaust aftertreatment system 100 may be employed as a stand-alone system for use in systems to achieve the first tailpipe emissions target.

In one implementation, the base exhaust aftertreatment system 100 includes an exhaust aftertreatment device 110 that includes a second SCR catalyst 113, a second reductant delivery system 126, one or multiple temperature sensors, one or multiple exhaust gas sensors, and a second controller 120 that includes a second instruction set 125 for controlling the second reductant delivery system 126. The second controller 120 communicates with other vehicle systems, e.g., an engine controller, via a communication bus 50.

One non-limiting embodiment of the exhaust aftertreatment device 110 is illustrated. The exhaust aftertreatment device 110 includes a plurality of fluidly connected exhaust purifying devices for purifying engine exhaust gas prior to expulsion out the tailpipe to ambient air. An exhaust purifying device is a device that is configured to oxidize, reduce, filter and/or otherwise treat constituents of the exhaust gas feedstream 15, including but not limited to hydrocarbons, carbon monoxide, nitrides of oxygen (NOx), particulate matter, and ammonia. In the non-limiting embodiment shown, first, second, third, and fourth exhaust purifying devices 111, 112, 113, and 114, respectively, are shown.

The first exhaust purifying device 111 may be an oxidation catalyst for oxidizing hydrocarbons and other constituents in the exhaust gas feedstream 15, in certain embodiments, and is referred to hereafter as an oxidation catalyst 111.

The second exhaust purifying device 112 is a particulate filter for filtering particulate matter from the exhaust gas feedstream.

The third exhaust purifying device 113 is also an SCR catalyst, i.e., the second SCR 113 in one embodiment.

In one embodiment, the second SCR catalyst 113 is a urea-based device that employs gaseous ammonia to react with and reduce NOx molecules to form elemental nitrogen (N2) and other inert gases. The injected reductant may be urea, which can be converted to ammonia (NH3), and stored on the substrate of the second SCR catalyst 113 to react with and reduce NOx molecules.

In one embodiment, a second heating device 115 may be interposed in the exhaust gas feedstream downstream of the second exhaust purifying device 112 and upstream of the third exhaust purifying device 113, and may be, in one embodiment, an electrically-powered resistive heater or heating element, a burner, or another heater, to inject heat energy into the exhaust gas flow and the injected reductant.

The fourth exhaust purifying device 114 may be an oxidation catalyst that is arranged downstream of the second SCR catalyst 113 and operates to oxidize unused ammonia from the second SCR catalyst 113.

The second reductant delivery system 126 includes a second reductant injector 127 having an injection nozzle that is positioned to inject reductant into the exhaust gas feedstream downstream of the second exhaust purifying device 112, i.e., the particulate filter, and upstream of the second SCR catalyst 113. The second reductant delivery system 126 is configured to controllably supply a metered flow of reductant into the exhaust gas feedstream upstream of the second SCR catalyst 113 to facilitate NOx reduction through the second SCR catalyst 113.

Each of the first, second, third, and fourth exhaust purifying devices 111, 112, 113, and 114, respectively, includes a ceramic or metallic substrate having flow channels that have been coated with suitable materials that include by way of non-limiting examples: platinum-group metals such as platinum, palladium and/or rhodium; other metals, such as vanadium, copper, cerium, and/or other materials. The coated materials effect chemical reactions to oxidize, reduce, filter, or otherwise treat constituents of the exhaust gas feedstream under certain conditions related to temperature, flowrate, air/fuel ratio and others. The embodiment shown includes the elements of the base exhaust aftertreatment system 100 in one arrangement, which is illustrative.

Other arrangements of the elements of the base exhaust aftertreatment system 100 may be employed within the scope of this disclosure, with such arrangements including the addition of other exhaust purifying devices and/or omission of one or more of the exhaust purifying devices, depending upon requirements of the specific application.

The sensors for monitoring the various exhaust purifying devices of the base exhaust aftertreatment system 100 include the tailpipe exhaust gas sensor 122 and the second temperature sensor 124. Other sensors (not shown) may include, for example, a particulate matter sensor, a delta pressure sensor for monitoring pressure drop across the SCR catalyst 113, additional temperature sensors, and/or other sensing devices and models for monitoring the exhaust gas feedstream. The tailpipe exhaust gas sensor 122 may be a NOx sensor, and in one embodiment may have wide-range air/fuel ratio sensing capability. Such sensors and models may be arranged to monitor or otherwise determine parameters relegated to the exhaust gas feedstream at specific locations. As such, the aforementioned sensors and/or models may be advantageously employed to monitor performance of individual ones of the exhaust purifying devices, monitor parameters associated with performance of a subset of the exhaust purifying devices, or monitor parameters associated with performance of the base exhaust aftertreatment system 100.

The second instruction set 125 is executed by the second controller 120 to control the second reductant delivery system 126 to achieve the first tailpipe emissions target in-use based upon signal inputs from the engine-out exhaust gas sensor 102, the tailpipe exhaust gas sensor 122 and the second temperature sensor 124.

The subsystem controller 220 is operatively connected to the first reductant delivery system 216 and in communication with the first exhaust gas sensor 212 and the first temperature sensor 214. The subsystem controller 220 is also in communication, via the communication bus 50, with the engine-out exhaust gas sensor 102, the tailpipe exhaust gas sensor 122 and the second temperature sensor 124 that are arranged to monitor the base exhaust aftertreatment system 100.

The subsystem controller 220 includes the instruction set 225 that is executable by the subsystem controller 220 to control the first reductant delivery system 216 to inject the reductant into the exhaust gas feedstream 15 upstream of the first SCR catalyst 210 based upon inputs from the first and second exhaust gas sensors and the first and second temperature sensors.

This includes the instruction set 225 being executed by the subsystem controller 220 to control the first reductant delivery system 216 to inject the reductant into the exhaust gas feedstream upstream of the first SCR catalyst 210 to achieve a target reductant/NOx ratio that is provided as the exhaust gas feedstream that is input to the base exhaust aftertreatment system 100.

Alternatively, or in addition, the subsystem controller 220 controls, via the instruction set 225, the first reductant delivery system 216 to inject the reductant into the exhaust gas feedstream 15 upstream of the first SCR catalyst 210 to achieve a target ammonia storage level on the first SCR catalyst 210 in anticipation of a projected need for NOx reduction, and as part of controlling the exhaust gas feedstream that is input to the base exhaust aftertreatment system 100.

The subsystem controller 220 employs data inputs from the exhaust gas sensors and the temperature sensors that are monitoring the base exhaust aftertreatment system 100, without affecting or changing control parameters associated with operation of the base exhaust aftertreatment system 100.

The base exhaust aftertreatment system 100 is configured to purify the exhaust gas feedstream 15 to achieve a first tailpipe emissions target in-use. The base exhaust aftertreatment system 100 includes an exhaust aftertreatment device 110 that includes the SCR catalyst 113, the second reductant delivery system 126, one or multiple temperature sensors, one or multiple exhaust gas sensors, and the second controller 120 that includes the second instruction set 125 for controlling the second reductant delivery system 126. The concepts described herein provide a modular subsystem that may be employed to enable achievement of an ultra-low NOx emissions target, either in a production vehicle build or a retrofit.

The term "controller" and related terms such as microcontroller, control, control unit, processor, etc. refer to one or various combinations of Application Specific Integrated Circuit(s) (ASIC), Field-Programmable Gate Array(s) (FPGA), electronic circuit(s), central processing unit(s), e.g., microprocessor(s) and associated non-transitory memory component(s) in the form of memory and storage devices (read only, programmable read only, random access, hard drive, etc.). The non-transitory memory component is capable of storing machine readable instructions in the form of one or more software or firmware programs or routines, combinational logic circuit(s), input/output circuit(s) and devices, signal conditioning, buffer circuitry and other components, which can be accessed by and executed by one or more processors to provide a described functionality. Input/output circuit(s) and devices include analog/digital converters and related devices that monitor inputs from sensors, with such inputs monitored at a preset sampling frequency or in response to a triggering event. Software, firmware, programs, instructions, control routines, code, algorithms, and similar terms mean controller-executable instruction sets including calibrations and look-up tables. Each controller executes control routine(s) to provide desired functions. Routines may be executed at regular intervals, for example every 100 microseconds during ongoing operation. Alternatively, routines may be executed in response to occurrence of a triggering event. Communication between controllers, actuators and/or sensors may be accomplished using a direct wired point-to-point link, a networked communication bus link, e.g., communication bus 50, a wireless link, or another communication link. Communication includes exchanging data signals, including, for example, electrical signals via a conductive medium; electromagnetic signals via air; optical signals via optical waveguides; etc. The data signals may include discrete, analog and/or digitized analog signals representing inputs from sensors, actuator commands, and communication between controllers.

Figure 3A:
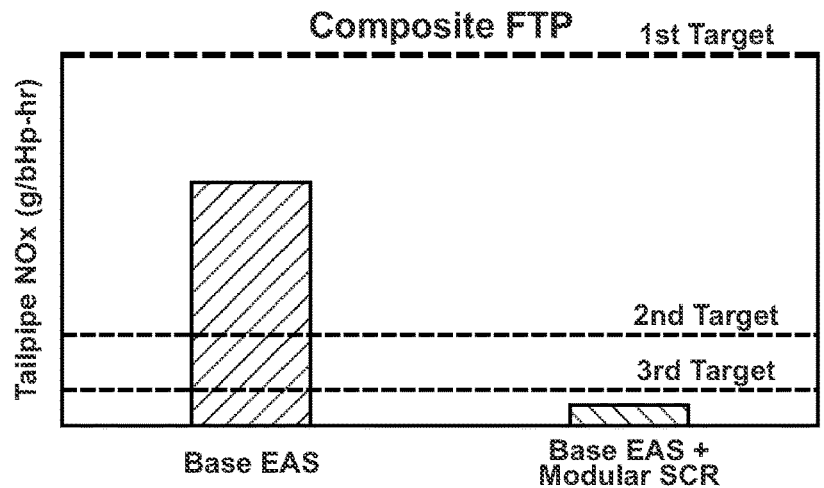
FIGS. 3A, 3B, and 3C graphically illustrate composite emissions test results associated with operation of the modular exhaust subsystem described with reference to FIGS. 1 and 2, in accordance with the disclosure.
Figure 3B:
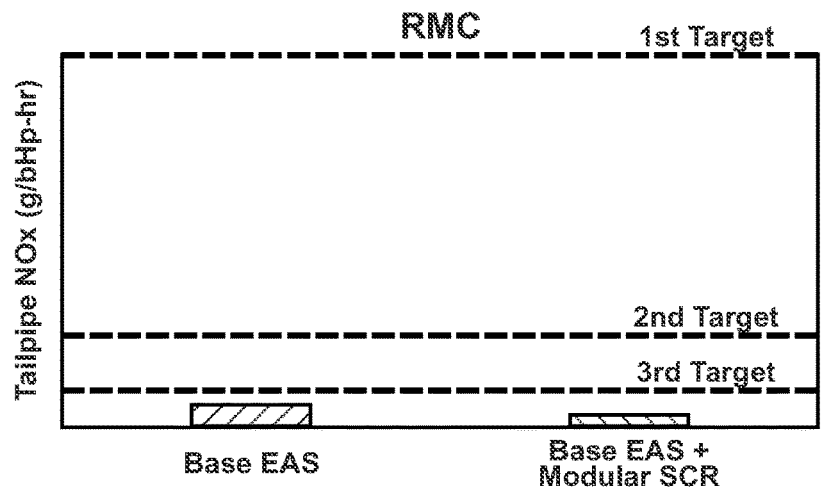
Figure 3C:
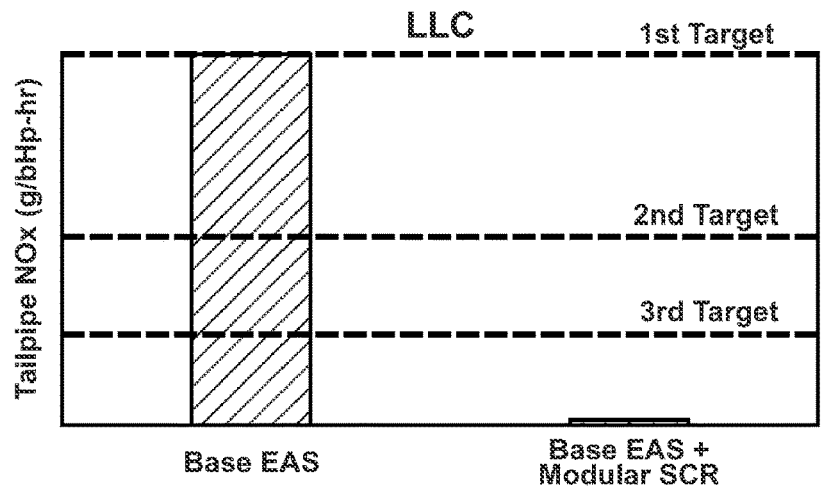

FIGS. 3A, 3B, and 3C each show composite emissions test results associated with operation of a vehicle system employing an embodiment of the engine 10, including results associated with an embodiment employing only the base exhaust aftertreatment system 100 (Base EAS) that is described with reference to FIG. 1, and results associated with an embodiment employing the exhaust aftertreatment system 250 including the modular exhaust subsystem 200 arranged upstream of the base exhaust aftertreatment system 100 (Base EAS+Modular SCR). The first, second and third emissions targets may be defined by a regulatory agency associated with a political entity or defined by a private entity (such as a company that employs a fleet of vehicles) or defined by a specific manufacturer. It is appreciated that the emissions performance capabilities of the base exhaust aftertreatment system 100, and of the exhaust aftertreatment system 250 including the modular exhaust subsystem 200 arranged upstream of the base exhaust aftertreatment system 100 are determined by factors associated with: engine control to achieve engine-out emissions targets; volumetric sizes and layouts of the exhaust aftertreatment devices; types and amounts of washcoats and catalytic materials; arrangement and operation of reductant injection system(s); and other factors. Thus, the emissions results described herein indicate relative improvements in emissions performance that can be obtained by the addition of an embodiment of the modular exhaust subsystem 200 upstream of an embodiment of the base exhaust aftertreatment system 100, as compared to emissions performance that can be obtained by the embodiment of the base exhaust aftertreatment system 100 alone.

FIG. 3A graphically shows Composite FTP (Federal Test Procedure) emissions test results for tailpipe NOx emissions (in units of g/bHP-hr). On the system having only the base exhaust aftertreatment system 100 (Base EAS), a first emissions target (1st Target) is achieved, but neither a second emissions target (2nd Target) nor a third emissions target (3rd Target) are achieved. On the system having the exhaust aftertreatment system 250 including the modular exhaust subsystem 200 arranged upstream of the base exhaust aftertreatment system 100 (Base EAS+Modular SCR), the first emissions target, the second emissions target, and the third emissions target are achieved.

FIG. 3B graphically shows composite RMC (Ramped Modal Cycle) emissions test results for tailpipe NOx emissions (in units of g/bHP-hr). On both the system having only the base exhaust aftertreatment system 100 (Base EAS), and the system having the exhaust aftertreatment system 250 including the modular exhaust subsystem 200 arranged upstream of the base exhaust aftertreatment system 100 (Base EAS+Modular SCR), the first emissions target (1st Target), the second emissions target (2nd Target), and the third emissions target (3rd Target) are achieved.

FIG. 3C graphically shows composite LLC (Low Load Cycle) emissions test results for tailpipe NOx emissions (in units of g/bHP-hr). On the system having only the base exhaust aftertreatment system 100 (Base EAS), neither the second emissions target (2nd Target) nor the third emissions target (3rd Target) are achieved. On the system having the exhaust aftertreatment system 250 including the modular exhaust subsystem 200 arranged upstream of the base exhaust aftertreatment system 100 (Base EAS+Modular SCR), the second emissions target (2nd Target) and the third emissions target (3rd Target) are achieved.

Figure 4A:
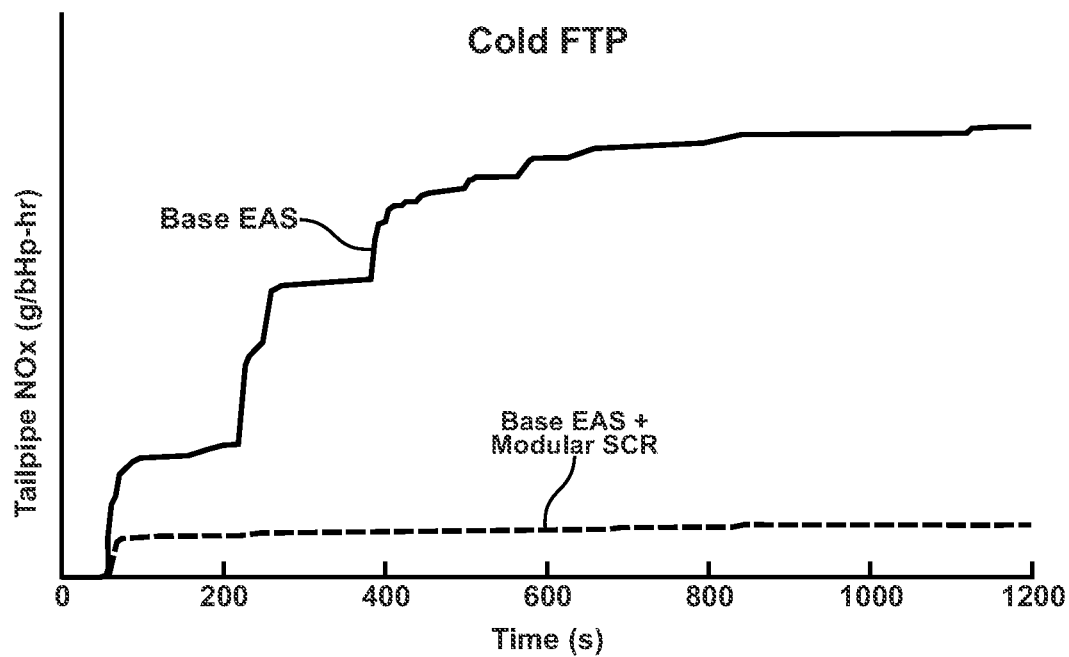
FIGS. 4A and 4B graphically illustrate cumulative emissions test results associated with operation of the modular exhaust subsystem described with reference to FIGS. 1 and 2, in accordance with the disclosure.

FIG. 4A graphically shows cumulative FTP emissions test results for tailpipe NOx emissions (in units of g/bHP-hr) in relation to time. On the system having only the base exhaust aftertreatment system 100 (Base EAS), the cumulative emissions increase throughout the test cycle. In contrast, on the system having the exhaust aftertreatment system 250 including the modular exhaust subsystem 200 arranged upstream of the base exhaust aftertreatment system 100 (Base EAS+Modular SCR), the cumulative emissions increase only during the initial operation of a cold start, and then level off.

Figure 4B:
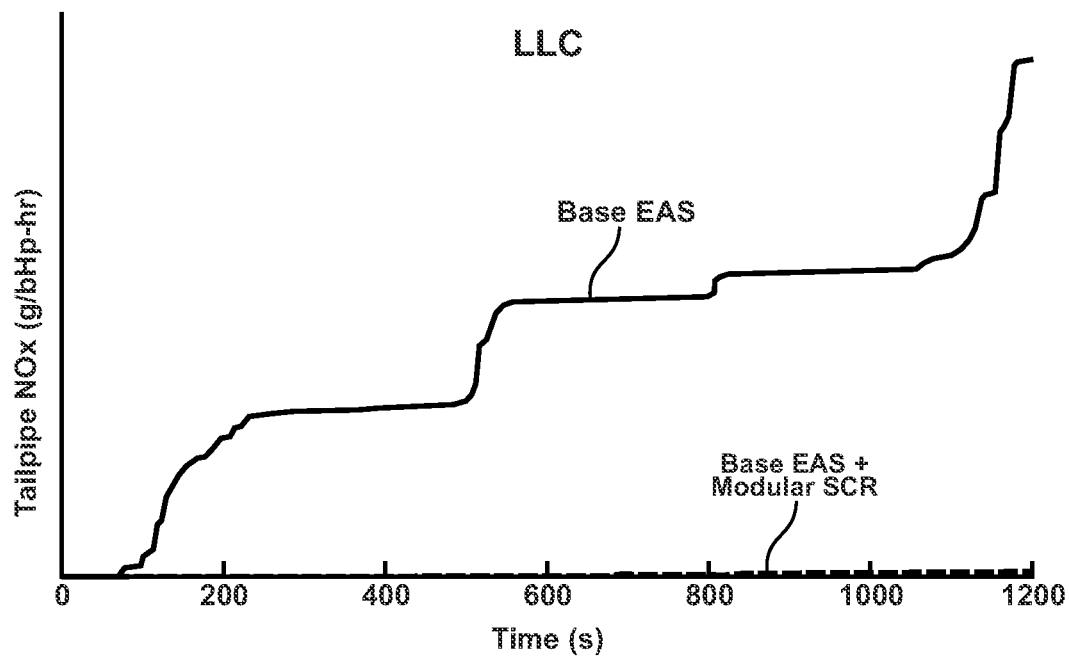

FIG. 4B graphically shows cumulative LLC emissions test results for tailpipe NOx emissions (in units of g/bHP-hr) in relation to time. On the system having only the base exhaust aftertreatment system 100 (Base EAS), the cumulative emissions increase throughout the test cycle. In contrast, on the system having the exhaust aftertreatment system 250 including the modular exhaust subsystem 200 arranged upstream of the base exhaust aftertreatment system 100 (Base EAS+Modular SCR), there may be no cumulative emissions.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the claims.

What is claimed is:

1. A modular exhaust subsystem for purifying an exhaust gas feedstream of a compression-ignition internal combustion engine upstream of a base exhaust aftertreatment system, comprising:
   a selective catalytic reduction (SCR) catalyst,
   a first exhaust gas sensor and a first temperature sensor arranged to monitor the SCR catalyst;
   a reductant delivery system arranged to inject a reductant into the exhaust gas feedstream upstream of the SCR catalyst;
   a controller, operatively connected to the reductant delivery system and in communication with the first exhaust gas sensor and the first temperature sensor,
   the controller further in communication with a second exhaust gas sensor and a second temperature sensor that are arranged to monitor the base exhaust aftertreatment system; and
   an engine-out exhaust gas sensor arranged to monitor the exhaust gas feedstream upstream of the SCR catalyst,
   wherein the controller includes an instruction set that is executable to control the reductant delivery system to inject the reductant into the exhaust gas feedstream upstream of the SCR catalyst based upon inputs from the engine-out exhaust gas sensor, the first and second exhaust gas sensors and the first and second temperature sensors,
   wherein the instruction set is executable to control the reductant delivery system to inject the reductant into the exhaust gas feedstream upstream of the SCR catalyst to achieve a target reductant/NOx ratio upstream of the base exhaust aftertreatment system.

2. The modular exhaust subsystem of claim 1, wherein the instruction set is executable to control the reductant delivery system to inject the reductant into the exhaust gas feedstream upstream of the SCR catalyst to achieve a target ammonia storage level on the SCR catalyst.

3. The modular exhaust subsystem of claim 1, wherein the first exhaust gas sensor comprises a NOx sensor.

4. The modular exhaust subsystem of claim 1, wherein the first exhaust gas sensor comprises a wide range air/fuel ratio sensor.

5. The modular exhaust subsystem of claim 1, wherein the reductant delivery system is arranged to inject urea into the exhaust gas feedstream upstream of the SCR catalyst.

6. The modular exhaust subsystem of claim 1, wherein the reductant delivery system is arranged to inject gaseous ammonia into the exhaust gas feedstream upstream of the SCR catalyst.

7. The modular exhaust subsystem of claim 1, wherein the modular exhaust subsystem is arranged in an underhood location.

8. The modular exhaust subsystem of claim 1, wherein the modular exhaust subsystem is arranged in an underbody location.

9. The modular exhaust subsystem of claim 1, further comprising a controllable heating element arranged in the exhaust gas feedstream upstream of the SCR catalyst.

10. The modular exhaust subsystem of claim 1, further comprising a heating device arranged to transfer heat to the exhaust gas feedstream upstream of the SCR catalyst.

11. The modular exhaust subsystem of claim 1, further comprising an oxidation catalyst being arranged upstream of the SCR catalyst.

12. A modular exhaust subsystem for an internal combustion engine, comprising:
   a selective catalytic reduction (SCR) catalyst;
   a first exhaust gas sensor and a first temperature sensor arranged to monitor the SCR catalyst;
   a reductant delivery system arranged to inject a reductant into an exhaust gas feedstream upstream of the SCR catalyst; and
   a controller, operatively connected to the reductant delivery system and in communication with the first exhaust gas sensor and the first temperature sensor;
   wherein the modular exhaust subsystem has a physical modularity and a control modularity in relation to a base exhaust aftertreatment system;
   wherein the base exhaust aftertreatment system includes an exhaust aftertreatment device, an engine-out exhaust gas sensor, and a second exhaust gas sensor and a second temperature sensor that are arranged to monitor the base exhaust aftertreatment system;
   wherein the physical modularity of the modular exhaust subsystem includes the modular exhaust subsystem being configured to be fluidly coupled between the internal combustion engine and the base exhaust aftertreatment system; and
   wherein the control modularity of the modular exhaust subsystem includes the controller of the modular exhaust subsystem having an instruction set that is executable to control the reductant delivery system to inject the reductant into the exhaust gas feedstream upstream of the SCR catalyst based upon inputs from the first and second exhaust gas sensors, the engine-out exhaust gas sensor, and the first and second temperature sensors,
   wherein the instruction set is executable to control the reductant delivery system of the modular exhaust subsystem to inject the reductant into the exhaust gas feedstream upstream of the SCR catalyst to achieve a target reductant/NOx ratio upstream of the base exhaust aftertreatment system.

13. The modular exhaust subsystem of claim 12, wherein the instruction set is executable to control the reductant delivery system of the modular exhaust subsystem to inject the reductant into the exhaust gas feedstream upstream of the SCR catalyst to achieve a target ammonia storage level on the SCR catalyst.

14. The modular exhaust subsystem of claim 12, wherein the reductant delivery system of the modular exhaust subsystem is arranged to inject urea into the exhaust gas feedstream upstream of the SCR catalyst.

15. The modular exhaust subsystem of claim 12, wherein the modular exhaust subsystem is arranged in an underhood location.

16. The modular exhaust subsystem of claim 12, wherein the first exhaust gas sensor comprises a NOx sensor.

17. The modular exhaust subsystem of claim 12, wherein the first exhaust gas sensor is arranged to monitor the exhaust gas feedstream upstream of the SCR catalyst of the modular exhaust subsystem, and wherein the first temperature sensor is arranged to monitor the exhaust gas feedstream upstream of the SCR catalyst of the modular exhaust subsystem.

* * * * *